(12) United States Patent
Usher

(10) Patent No.: US 11,011,968 B2
(45) Date of Patent: May 18, 2021

(54) SYSTEM FOR GENERATING ELECTRICAL ENERGY BY EFFICIENT MOVEMENT OF A SPECIALIZED INDUCTIVE MEDIUM

(71) Applicant: Kyle Dylan Usher, Rubicon, WI (US)

(72) Inventor: Kyle Dylan Usher, Rubicon, WI (US)

( * ) Notice: Subject to any disclaimer, the term of this patent is extended or adjusted under 35 U.S.C. 154(b) by 49 days.

(21) Appl. No.: 16/709,865

(22) Filed: Dec. 10, 2019

(65) Prior Publication Data
US 2020/0212788 A1 Jul. 2, 2020

Related U.S. Application Data

(60) Provisional application No. 62/917,763, filed on Dec. 31, 2018.

(51) Int. Cl.
*H02K 44/08* (2006.01)
*H02K 44/18* (2006.01)
*H02K 44/00* (2006.01)

(52) U.S. Cl.
CPC ........... *H02K 44/085* (2013.01); *H02K 44/18* (2013.01)

(58) Field of Classification Search
CPC ...... H02K 44/00; H02K 44/08; H02K 44/085; H02K 44/10; H02K 44/12; H02K 44/18

USPC .......................................................... 310/11
See application file for complete search history.

(56) References Cited

U.S. PATENT DOCUMENTS

| | | | | |
|---|---|---|---|---|
| 4,749,890 | A * | 6/1988 | Houston | H02K 44/085 310/11 |
| 6,982,501 | B1 * | 1/2006 | Kotha | B82Y 25/00 310/10 |
| 7,105,935 | B2 * | 9/2006 | Hsu | H02K 44/08 290/2 |
| 7,745,962 | B2 * | 6/2010 | Morgenstein | H02K 44/08 310/11 |

* cited by examiner

*Primary Examiner* — Burton S Mullins
(74) *Attorney, Agent, or Firm* — Ashkan Najafi

(57) ABSTRACT

A system for generating electrical energy by efficient movement of a specialized inductive medium that fulfills a need for new sources of electricity. The system for generating electrical energy by efficient movement of a specialized inductive medium includes an evacuated tube serving as a cathode disposed on a pipe, the evacuated tube contains a plurality of emulsified copper, the emulsified copper serves as the specialized inductive medium. The overall system includes a gear pump that moves the emulsified copper at high speed through the pipe where it is influenced by the magnet and the electric current is induced in the high-speed emulsified copper.

18 Claims, 6 Drawing Sheets

US 11,011,968 B2

SYSTEM FOR GENERATING ELECTRICAL ENERGY BY EFFICIENT MOVEMENT OF A SPECIALIZED INDUCTIVE MEDIUM

CROSS-REFERENCE TO RELATED APPLICATION

This non-provisional patent application claims benefit and priority to U.S. Provisional Patent Application No. 62/917,763 filed on Dec. 31, 2018.

FIELD OF THE INVENTION

The present invention is a system for generating electrical energy. More specifically, the present invention is a system for generating electrical energy by efficient movement of a specialized inductive medium.

BACKGROUND OF THE INVENTION

Electricity may be derived from many sources, including a moving phenomenon, such as water or wind by using turbines, or such as light by using solar cells, or such as fossil fuels (e.g., coal), nuclear power, or the like.

However, there exists a need for new sources of electricity, especially with the eventual decline in fossil fuels that are presently used to generate electricity.

SUMMARY OF THE INVENTION

The system for generating electrical energy by efficient movement of a specialized inductive medium includes a system for generating electrical energy by efficient movement of a specialized inductive medium, comprising a load consuming electric power from the overall system and then feeding the electric power back into the overall system via an anode to form a complete circuit, an inverter converting direct current (DC) from the cathode into alternating current (AC), an evacuated tube serving as a pressure control mechanism and housing for the cathode and is disposed on a pipe, the evacuated tube contains a quantity of emulsified copper, the emulsified copper serves as the specialized inductive medium, a magnet disposed on the pipe that performs electromagnetic induction on the emulsified copper, a gear pump powered by an external source, a plurality of switches, rheostats, and diodes, the diodes include locations at the anode and the cathode, the switches, the rheostats, and the diodes are in electrical connection with the evacuated tube, the electromagnet, and the gear pump with a plurality of first wires, a grounding wire having a first end and a second end, the first end of the grounding wire is coupled to the anode, and a heat sink is disposed on the pipe to cool the system.

It is an object of the present invention to provide a system for generating electrical energy by efficient movement of a specialized inductive medium that may replace one or more existing generators at one or more power plants and construct one or more new power plants featuring one or more wind turbine-powered or hydroelectric versions.

It is an object of the present invention to provide a system for generating electrical energy by efficient movement of a specialized inductive medium that may provide an economical source of electricity for one or more large cryptocurrency mining operations.

It is an object of the present invention to provide a system for generating electrical energy by efficient movement of a specialized inductive medium that may provide an economical source of electricity for the distillation of seawater via one or more large electric boilers to manufacture desalinated drinking water.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
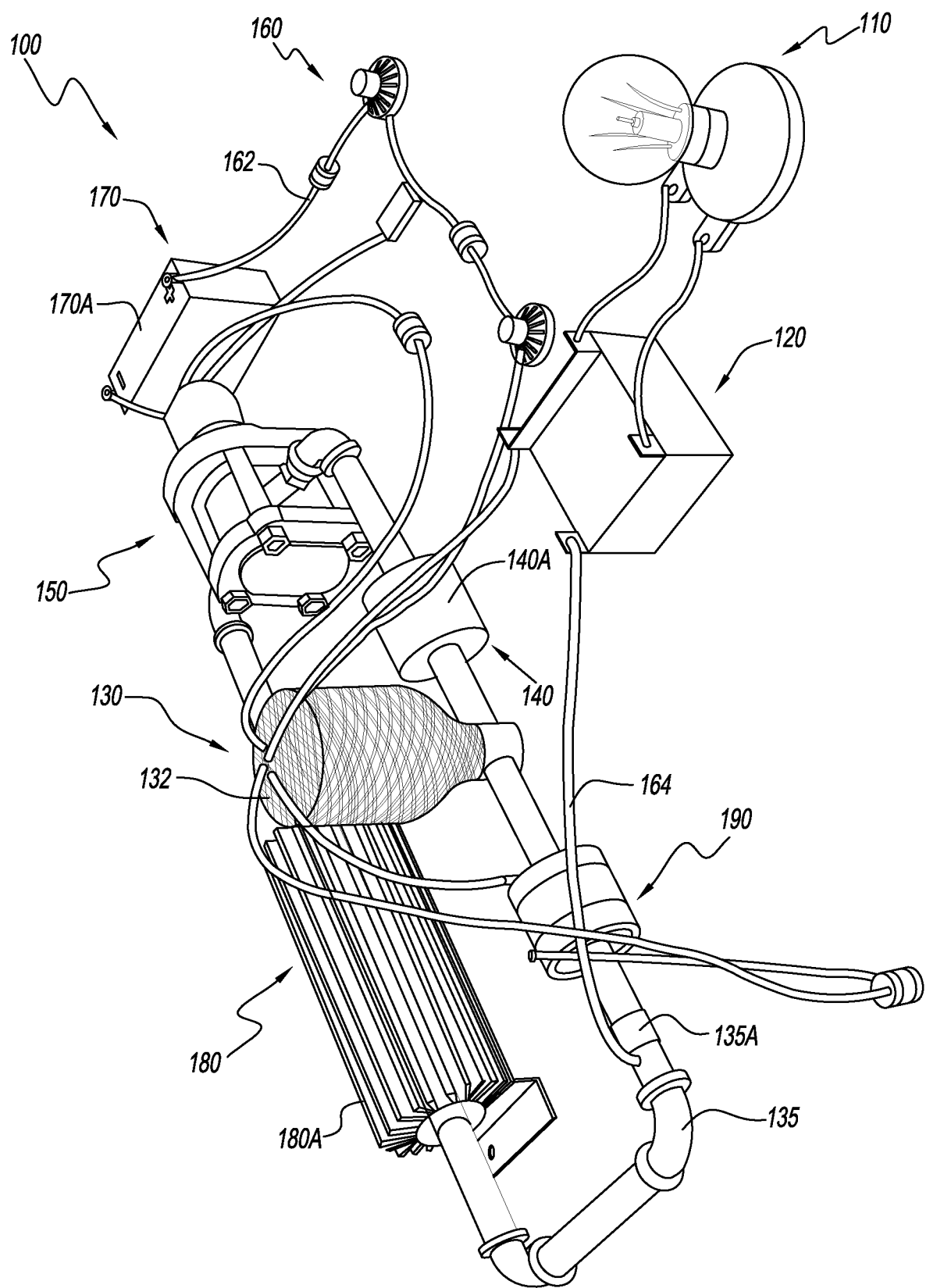
FIG. 1 illustrates a front perspective view of a system for generating electrical energy by efficient movement of a specialized inductive medium, in accordance with one embodiment of the present invention.

FIG. 1 illustrates a front perspective view of a system for generating electrical energy by efficient movement of a specialized inductive medium 100, in accordance with one embodiment of the present invention.

The overall system 100 may include a load 110, an inverter 120, an evacuated tube 130, a magnet 140, a gear pump 150, a plurality of switches, rheostats, and diodes 160, a battery 170, a heat sink 180, and an electromagnet 190.

The load 110 may consume electric power from the overall system 100 and is then fed back into the overall system 100 via an anode 135A or other negative ion source to form a complete circuit. The inverter 120 may convert direct current (DC) from the overall system 100 into alternating current (AC). The evacuated tube 130 may include a cathode 132 or other positive ion source and be disposed on a polyvinyl chloride pipe 135 or PVC pipe or the like. The magnet 140 may be a permanent magnet 140A or the like and be disposed on a polyvinyl chloride pipe 135 or PVC pipe or the like. The magnet 140 that may perform electromagnetic induction on the overall system 100 may be a rare earth metal magnet 140A or the like. The gear pump 150 may be mechanically powered, electrically powered, or the like. The switches, rheostats, and diodes 160 may be in electrical connection with the evacuated tube 130, the magnet 140, and the gear pump 150 with a plurality of first wires 162 or the like. The battery 170 may be substituted with a solar cell 170A, or another external power source (not pictured). The heat sink 180 may be a water-cooling system 180A or the like. The electromagnet 190 may be optional and be a secondary electromagnetic source or the like.

The inverter 120, the evacuated tube 130, the magnet 140, the gear pump 150, the switches, rheostats, and diodes 160, and the battery 170 may be in electrical connection together with a plurality of second wires 164 or the like.

Figure 2:
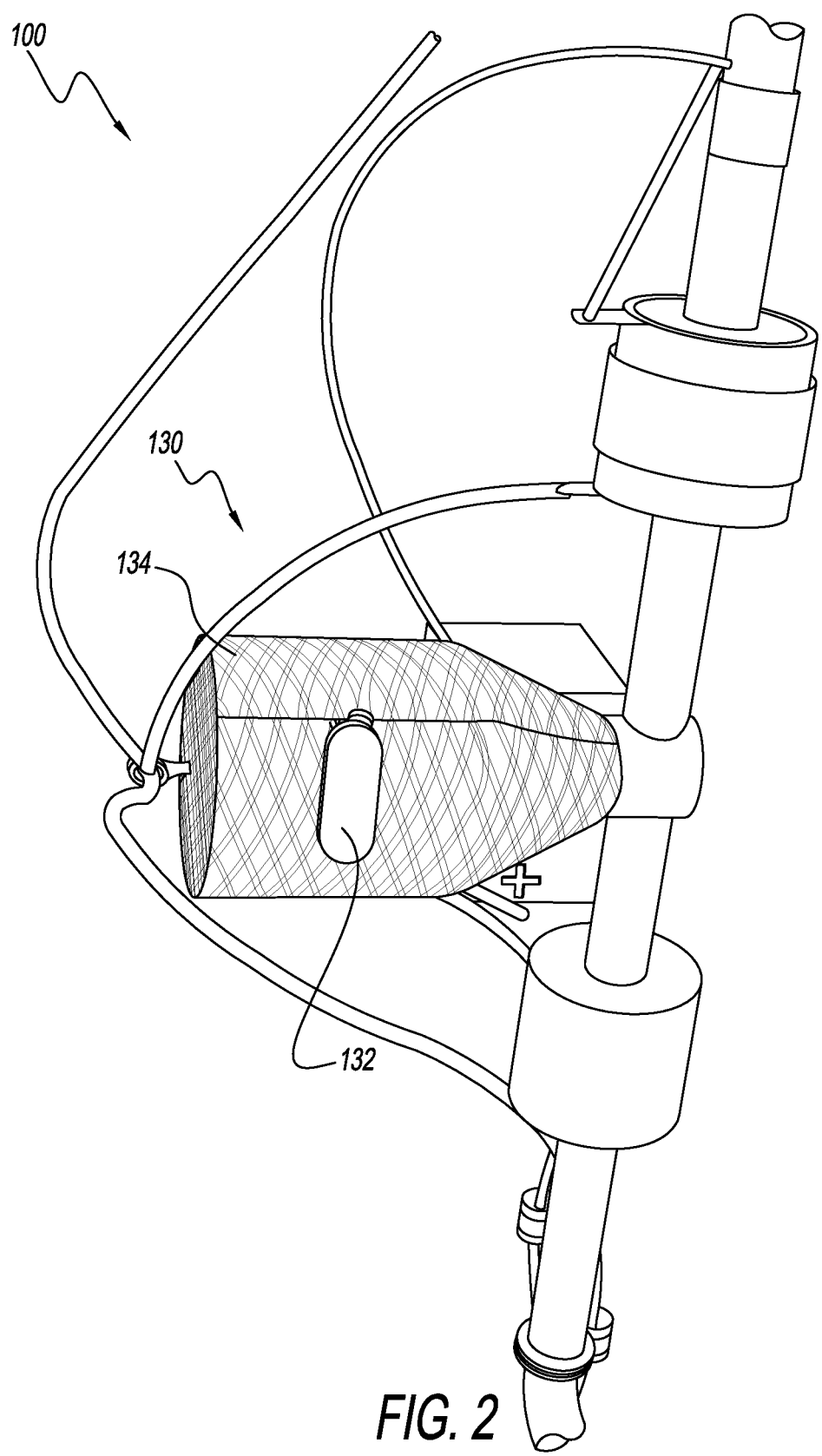
FIG. 2 illustrates a front perspective view of the evacuated tube equipped with a protective Faraday cage, in accordance with one embodiment of the present invention.

FIG. 2 illustrates a front perspective view of a Faraday cage 134, in accordance with one embodiment of the present invention.

The Faraday cage 134 may be disposed around the evacuated tube 130 to block electromagnetic fields from the evacuated tube 130.

Figure 3:
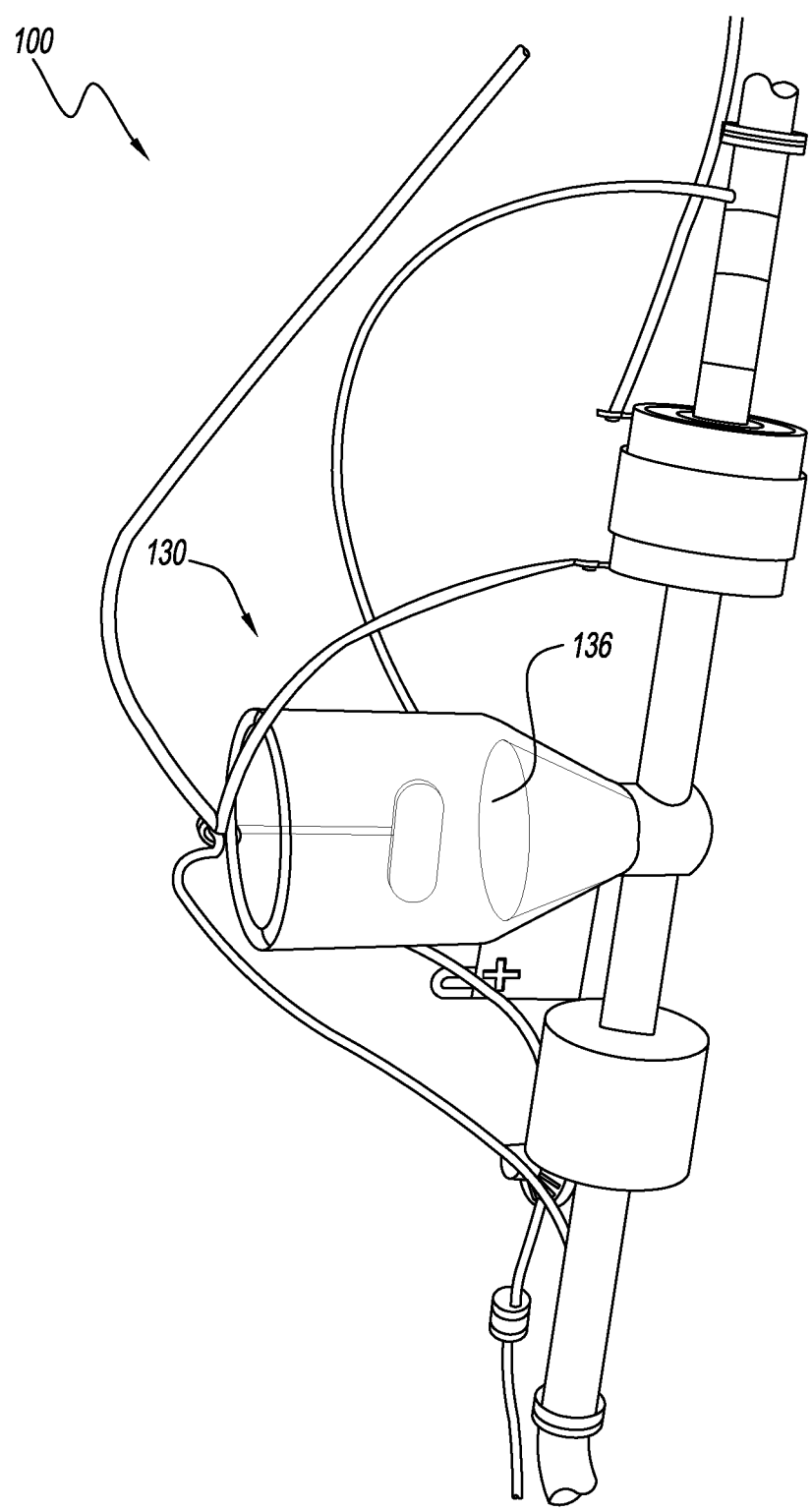
FIG. 3 illustrates a front perspective view of a quantity of emulsified copper present within the evacuated tube, in accordance with one embodiment of the present invention.

FIG. 3 illustrates a front perspective view of a quantity of emulsified copper 136, in accordance with one embodiment of the present invention.

The emulsified copper 136 may be contained within the evacuated tube 130. The emulsified copper 136 may be made of very fine copper powder or the like, the copper particles that make up the very fine copper powder may be approximately less than 45 microns, which can be mixed with Galinstan, which is a liquid metal alloy whose composition is part of a family of eutectic alloys that is selected from the group consisting of gallium, indium, and tin at any varying ratio as long as the ratio permits an even distribution of copper particles among the surface area of the liquid metal to create a free flowing, electrically conductive liquid. Eutectic alloys such as Galinstan are liquids at room temperature that melt at approximately 11° C. (52° F.), while commercial Galinstan melts at approximately −19° C. (−2° F.).

Common knowledge of electromagnetism provides that magnetism and electricity are closely related, as evidenced by the fact that when a copper wire is quickly passed through a magnetic field, an electric current is induced in the copper wire. This is also true for emulsified copper 136. If a quantity of emulsified copper 136 was prepared and quickly passed through a magnetic field, there would be a measurable electric current generated within it as well. It should be noted that there is a specific type of copper powder that is preferred in the manufacturing of emulsified copper known as spherical copper powder described in Ultrafine Copper Powder specification sheet by CNPC Powder, which is hereby incorporated by reference for all purposes as if fully set forth herein.

Figure 4:
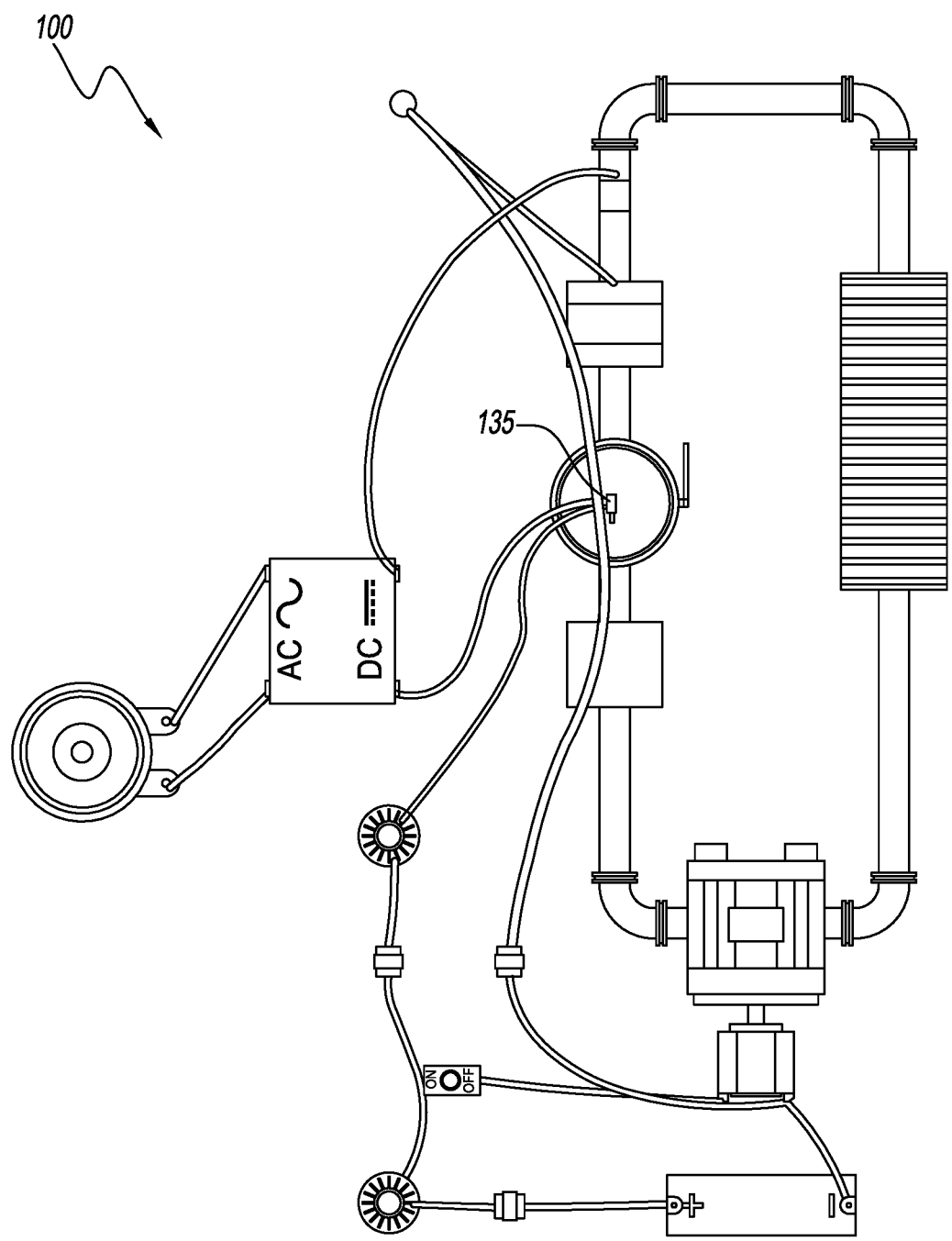
FIG. 4 illustrates an above perspective view of a system for generating electrical energy by efficient movement of a specialized inductive medium without a Faraday cage covering the evacuated tube, in accordance with one embodiment of the present invention.

FIG. 4 illustrates an above perspective view of a system for generating electrical energy by efficient movement of a specialized inductive medium 100, in accordance with one embodiment of the present invention.

The overall system 100 illustrated in FIG. 4 does not include a Faraday cage disposed on the evacuated tube (FIG. 2, 134). A cathode 135 may be disposed through the top of the evacuated tube 130 that is coupled to the second wires 164.

Figure 5:
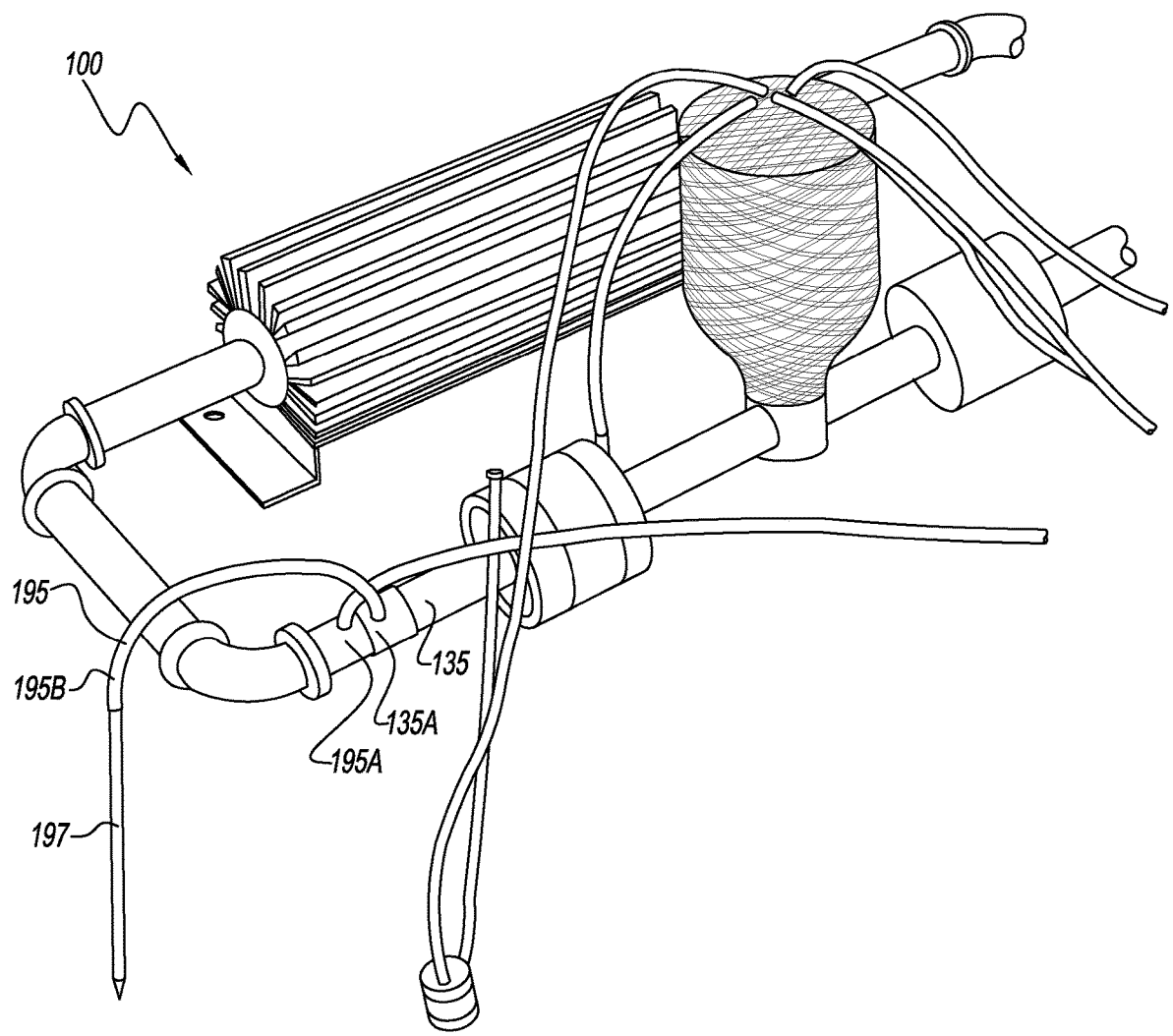
FIG. 5 illustrates a front perspective view of a grounding wire, in accordance with one embodiment of the present invention.

FIG. 5 illustrates a front perspective view of a grounding wire 195, in accordance with one embodiment of the present invention.

The grounding wire 195 may include a first end 195A and a second end 195B. The first end 195A of the grounding wire 195 may be coupled to the anode 135A. The second end 195B of the grounding wire 195 may be coupled to a grounding rod 197 or the like to provide a ground to the overall system 100.

Figure 6:
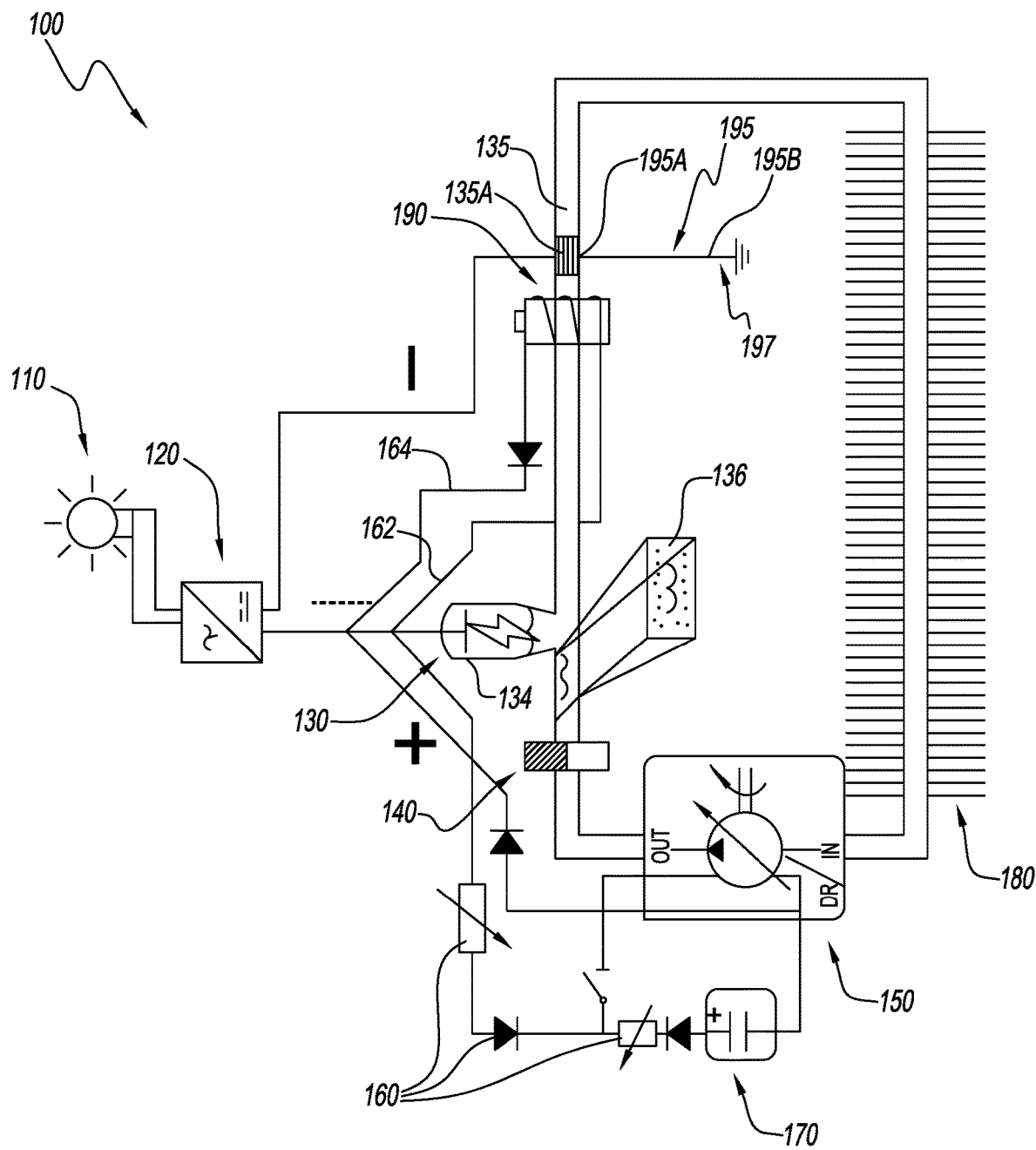
FIG. 6 illustrates an electrical schematic of the system for generating electrical energy by efficient movement of a specialized inductive medium, in accordance with one embodiment of the present invention.

FIG. 6 illustrates an electrical schematic of the system for generating electrical energy by efficient movement of a specialized inductive medium 100, in accordance with one embodiment of the present invention.

The overall system 100 may include a load 110, an inverter 120, an evacuated tube 130, a magnet 140, a gear pump 150, a plurality of switches, rheostats, and diodes 160, a battery 170, a heat sink 180, and an electromagnet 190.

The inverter 120 may receive direct current or DC from the cathode 132 and convert it into alternating current or AC. The evacuated tube 130 may include a Faraday cage 134 disposed around the evacuated tube 130 to block electromagnetic fields from the evacuated tube 130. The magnet 140 may provide magnetic power to the overall system 100. The gear pump 150 may move a plurality of emulsified copper (FIG. 3, 136) at relative high speed through the PVC tubing 135. The emulsified copper is influenced by the magnet 140, meaning an electric current is induced in rapidly moving emulsified copper and when the emulsified copper stream flows through the evacuated tube 130 having a cathode 132. This electric current is transferred to the cathode 132 in the form of an electric arc or the like. This allows for the electric current to be used by whatever load 110 is implemented into the circuit.

When the electric current has been used by the load 110, it is then fed back into the overall system 100 via an anode 135A or a negative ion, to form a complete circuit. The emulsified copper 136 is then drawn back into the intake nozzle (not shown) of the gear pump 150 by suction, and the cycle is repeated in the overall system 100. Peripheral details include the presence of various rectifier diodes at certain points of the overall system 100 as a countermeasure against short circuiting, as well as the presence of an optional electromagnet 190 powered by a portion of the output energy, for reasons previously described, and a heatsink 180.

Due to the fact that Galinstan expands when it is heated, (what is known as a thermometer effect) and it will likely heat up when an electric current is generated within it, the overall system 100 will need a mechanism to relieve the pressure caused by the expanding Galinstan, so that the pipeline does not explode and create a hazardous mess.

The solution to this problem is the aforementioned evacuated tube 130 that includes containing a cathode 132 to collect the energy generated by the overall system 100 that double functions as a pressure relief mechanism, due to the fact that the liquid metal could simply expand into the negative pressure of the evacuated tube 130, and while this may somewhat weaken the vacuum in the evacuated tube 130 as a result, it would not likely be enough to impede its function. This is in contrast to a thermionic valve or a vacuum tube (not shown), which is an obsolete electrical component with a different function.

An important feature of the system 100 is its very high energy density. The combination of both efficient movement of electricity-generating medium and high inductive surface area of the medium itself means that a relatively large amount of electrical energy may be generated in a very small space.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A system for generating electrical energy by efficient movement of a specialized inductive medium, comprising:
   a load consuming electric power from the overall system and then feeding the electric power back into the overall system via an anode to form a complete circuit;
   an inverter converting direct current from the load into alternating current;
   an evacuated tube serving as a pressure control mechanism and housing for a cathode and is disposed on a pipe, the evacuated tube contains a quantity of emulsified copper, the emulsified copper serves as the specialized inductive medium;
   a magnet disposed on the pipe that performs electromagnetic induction on the emulsified copper;
   a gear pump powered by any external source;
   a plurality of switches, rheostats, and diodes, the diodes include locations at the anode and the cathode, the switches, the rheostats, and the diodes are in electrical connection with the evacuated tube, the electromagnet, and the gear pump with a plurality of first wires;
   a grounding wire having a first end and a second end, the first end of the grounding wire is coupled to the anode, and;
   a heat sink disposed on the pipe to cool the system.

2. The overall system according to claim 1, wherein one of the components comprising the emulsified copper is a fine copper powder.

3. The overall system according to claim 2, wherein the particles comprising the fine copper powder are ideally 45 microns in size or less.

4. The overall system according to claim 2, wherein the particles comprising the fine copper powder are ideally of a spherical shape.

5. The overall system according to claim 2, wherein the very fine copper powder is mixed with Galinstan to permit an even distribution of copper particles among a volume of liquid metal to create a free flowing and electrically conductive liquid.

6. The overall system according to claim 5, wherein Galinstan is part of a eutectic alloy that is selected from the group consisting of gallium, indium, and tin.

7. The overall system according to claim 1, wherein the pipe is a polyvinyl chloride pipe.

8. The overall system according to claim 1, wherein the magnet is a permanent magnet.

9. The overall system according to claim 1, wherein the magnet is a rare earth metal magnet.

10. The overall system according to claim 1, wherein the gear pump moves the emulsified copper at high speed through the pipe where it is influenced by the magnet and an electric current is induced in the high-speed emulsified copper.

11. The overall system according to claim 1, wherein the gear pump is electrically or otherwise powered.

12. The overall system according to claim 1, wherein the switches include a control switch.

13. The overall system according to claim 1, wherein the rheostats include a plurality of adjustable resistors.

14. The overall system according to claim 1, wherein the second end of the grounding wire is coupled to a grounding rod or foundation to provide a ground to the overall system.

15. The overall system according to claim 1, wherein the battery is substituted with a solar cell.

16. The overall system according to claim 1, wherein the battery is substituted with an external power source.

17. The overall system according to claim 1, wherein the heat sink is a water-cooling system.

18. The overall system according to claim 1, further comprising an optional electromagnet serving as a secondary source of electromagnetic induction.

* * * * *